United States Patent
Sari et al.

(10) Patent No.: US 9,752,538 B2
(45) Date of Patent: Sep. 5, 2017

(54) DRIVE ARRANGEMENT FOR AN ASSEMBLY OF AN INTERNAL COMBUSTION ENGINE, AND EXHAUST-GAS RECIRCULATION VALVE

(71) Applicant: PIERBURG GMBH, Neuss (DE)

(72) Inventors: Osman Sari, Grevenbroich (DE); Norbert Simons, Duesseldorf (DE); Robert Sabic, Neuss (DE); Manfred Bohnen, Moenchengladbach (DE)

(73) Assignee: PIERBURG GMBH, Neuss (DE)

( * ) Notice: Subject to any disclaimer, the term of this patent is extended or adjusted under 35 U.S.C. 154(b) by 0 days.

(21) Appl. No.: 14/770,090

(22) PCT Filed: Jan. 21, 2014

(86) PCT No.: PCT/EP2014/051139
§ 371 (c)(1),
(2) Date: Aug. 25, 2015

(87) PCT Pub. No.: WO2014/131558
PCT Pub. Date: Sep. 4, 2014

(65) Prior Publication Data
US 2016/0003197 A1    Jan. 7, 2016

(30) Foreign Application Priority Data
Feb. 27, 2013  (DE) .................. 10 2013 101 938

(51) Int. Cl.
*B60H 1/03*    (2006.01)
*F02M 25/07*   (2006.01)
(Continued)

(52) U.S. Cl.
CPC ....... *F02M 25/0772* (2013.01); *F02D 9/1035* (2013.01); *F02M 26/54* (2016.02);
(Continued)

(58) Field of Classification Search
CPC .......... F02N 19/10; F02N 19/02; F02N 19/04; F01M 5/021; F01P 11/20; F01P 5/04; F02D 41/0065
(Continued)

(56) References Cited

U.S. PATENT DOCUMENTS

| 5,497,040 A | 3/1996 | Sato |
| 6,382,195 B1 | 5/2002 | Green et al. |

(Continued)

FOREIGN PATENT DOCUMENTS

| CN | 101621226 A | 1/2010 |
| DE | 40 39 351 A1 | 6/1992 |

(Continued)

*Primary Examiner* — Jacob Amick
*Assistant Examiner* — Charles Brauch
(74) *Attorney, Agent, or Firm* — Norman B. Thot

(57) ABSTRACT

A drive arrangement for an aggregate of an internal combustion engine includes a drive element, a housing, and an intermediate element. The housing comprises a static receiving part comprising a stop, and a cover fastened on the static receiving part. The cover is configured to bear axially against the stop. The intermediate element is arranged, in a preloaded state, between the drive element and the housing, radially between the cover and the drive element, and, in an elastically deformed state, axially between the drive element and the cover.

13 Claims, 3 Drawing Sheets

(51) Int. Cl.

| | | |
|---|---|---|
| *F02D 9/10* | (2006.01) | |
| *F16F 1/373* | (2006.01) | |
| *H02K 5/24* | (2006.01) | |
| *F16F 1/376* | (2006.01) | |
| *H02K 5/00* | (2006.01) | |
| *F02M 26/54* | (2016.01) | |
| *F01P 11/20* | (2006.01) | |
| *F02N 19/04* | (2010.01) | |
| *F01M 5/02* | (2006.01) | |
| *F02N 19/02* | (2010.01) | |
| *F02N 19/10* | (2010.01) | |

(52) U.S. Cl.
CPC .............. *F16F 1/373* (2013.01); *F16F 1/376* (2013.01); *H02K 5/00* (2013.01); *H02K 5/24* (2013.01); *F01M 5/021* (2013.01); *F01P 11/20* (2013.01); *F02N 19/02* (2013.01); *F02N 19/04* (2013.01); *F02N 19/10* (2013.01)

(58) Field of Classification Search
USPC ..................................................... 123/142.5 E
See application file for complete search history.

(56) References Cited

U.S. PATENT DOCUMENTS

| | | | |
|---|---|---|---|
| 6,860,466 B2 | 3/2005 | Sakurai et al. | |
| 2004/0012289 A1* | 1/2004 | Gross | .................... F04D 29/626 |
| | | | 310/91 |
| 2006/0157027 A1 | 7/2006 | Ichikawa et al. | |
| 2007/0001522 A1 | 1/2007 | Nitzsche | |
| 2007/0084439 A1 | 4/2007 | Isogai et al. | |
| 2009/0265084 A1 | 10/2009 | Enomoto | |
| 2010/0089370 A1* | 4/2010 | Furukawa | ............... F02M 26/26 |
| | | | 123/568.12 |
| 2010/0119290 A1* | 5/2010 | Thorpe | ................... A45D 33/02 |
| | | | 401/149 |
| 2010/0186548 A1* | 7/2010 | Wegner | .................... B60S 1/166 |
| | | | 74/606 R |
| 2014/0069397 A1 | 3/2014 | Simons | |

FOREIGN PATENT DOCUMENTS

| | | |
|---|---|---|
| DE | 694 16 269 T2 | 9/1999 |
| DE | 100 05 431 A1 | 8/2001 |
| DE | 103 44 624 A1 | 4/2005 |
| DE | 10 2004 017 300 A1 | 11/2005 |
| DE | 10 2006 046 451 A1 | 4/2007 |
| DE | 10 2008 027 490 A1 | 12/2009 |
| DE | 10 2011 001 535 A1 | 9/2012 |
| EP | 1 126 156 A2 | 8/2001 |
| EP | 1 544 438 A2 | 6/2005 |
| EP | 1 911 958 A1 | 4/2008 |
| JP | 7-163117 A | 6/1995 |
| JP | 2004-521597 A | 7/2004 |
| JP | 2007-32356 A | 2/2007 |
| JP | 2009-171828 A | 7/2009 |
| JP | 2012-100516 A | 5/2012 |
| KR | 10-0925999 B1 | 11/2009 |
| KR | 10-2011-0028880 A | 3/2011 |
| WO | WO 03/005532 A1 | 1/2003 |

* cited by examiner

DRIVE ARRANGEMENT FOR AN ASSEMBLY OF AN INTERNAL COMBUSTION ENGINE, AND EXHAUST-GAS RECIRCULATION VALVE

CROSS REFERENCE TO PRIOR APPLICATIONS

This application is a U.S. National Phase application under 35 U.S.C. §371 of International Application No. PCT/EP2014/051139, filed on Jan. 21, 2014 and which claims benefit to German Patent Application No. 10 2013 101 938.2, filed on Feb. 27, 2013. The International Application was published in German on Sep. 4, 2014 as WO 2014/131558 A1 under PCT Article 21(2).

FIELD

The present invention relates to a drive arrangement for an aggregate of an internal combustion engine, comprising a drive element, a housing and an intermediate element arranged in a preloaded state between the drive element and the housing, and an exhaust gas recirculation valve comprising a housing and an electric motor serving as a drive element and driving a valve via a transmission, the valve controlling a passage between an inlet and an outlet.

BACKGROUND

Drive arrangements of the above type are used to drive various aggregates in internal combustion engines. A difference is thereby to be made between aggregates which are operated continuously or at least over a longer period of time, such as, for example, pumps for conveying air, exhaust gas, coolant or other hydraulic fluids, and aggregates whose drive is operative only over a defined adjusting range, such as, for example, valves and flaps, particularly exhaust gas recirculation valves, exhaust gas flaps or throttle flaps.

All of these drives are exposed to large vibratory and impact loads in the internal combustion engine so that, in order to avoid damage at the drive element, the drive element must be supported to allow for the best possible damping both radially and axially.

It has thus become known to use intermediate elements to attach an actuating motor that are intended to improve this damping effect of the bearing support.

DE 10 2006 046 451 A1, for example, describes a bearing arrangement of a metal-encapsulated DC electric motor in a housing of synthetic resin for a throttle flap. Due to the differences in the deformability of the synthetic resin and the metal housing of the electric motor, the former must be protected against creeping deformation. An elastic body is therefore provided between the shaftless end of the electric motor and the resin housing, with the abutment face of the elastic body being larger on the resin housing than that abutment face which is in abutment on the metal housing. The elastic body comprises a metallic disk having its front edge provided with trapezoidal rubber cams. A disadvantage of this arrangement, however, resides in the bonding connection between the rubber cams and the metal disk. The radial fixation of the electric motor further takes place merely via the attachment on the A-bearing plate.

U.S. Pat. No. 6,860,466 B2 describes radially supporting the free end of the DC motor in the housing of the throttle valve by means of a metallic ring. EP 1 544 428 A2 describes a metallic anti-vibration ring for bracing the electric motor and the housing. It is also known to place an O-ring for vibration damping axially between the housing and the motor. A radial tolerance-insensitive bearing support also provided on the B-bearing is not, however, described in the prior art.

DE 10 2004 017 300 A1 describes a two-part intermediate element to support the drive of a secondary air blower on the A-bearing plate and on a support plate in the area of the B-bearing. The intermediate element includes corresponding shapes both for radial and for axial support. Assembly of this bearing support is, however, quite complex. The attachment of the support plate on the housing and the correct positioning of the support plate to obtain the desired effect of the intermediate element are particularly difficult.

SUMMARY

An aspect of the present invention is to provide a drive arrangement which is durable, which allows the drive to be axially braced in a housing, which is vibration-damping, and which radially supports the drive in a reliable manner. A further aspect of the present invention is to provide a drive arrangement which is as simple as possible so that the components of the housing will be tolerance-insensitive to the highest possible extent. A further aspect of the present invention to provide a drive arrangement which can be inexpensively produced. An aspect of the present invention is also to provide an exhaust gas recirculation valve comprising a drive arrangement having the above advantages.

In an embodiment, the present invention provides a drive arrangement for an aggregate of an internal combustion engine which includes a drive element, a housing, and an intermediate element. The housing comprises a static receiving part comprising a stop, and a cover fastened on the static receiving part. The cover is configured to bear axially against the stop. The intermediate element is arranged, in a preloaded state, between the drive element and the housing, radially between the cover and the drive element, and, in an elastically deformed state, axially between the drive element and the cover.

BRIEF DESCRIPTION OF THE DRAWINGS

The present invention is described in greater detail below on the basis of embodiments and of the drawings in which.

DETAILED DESCRIPTION

Figure 1:
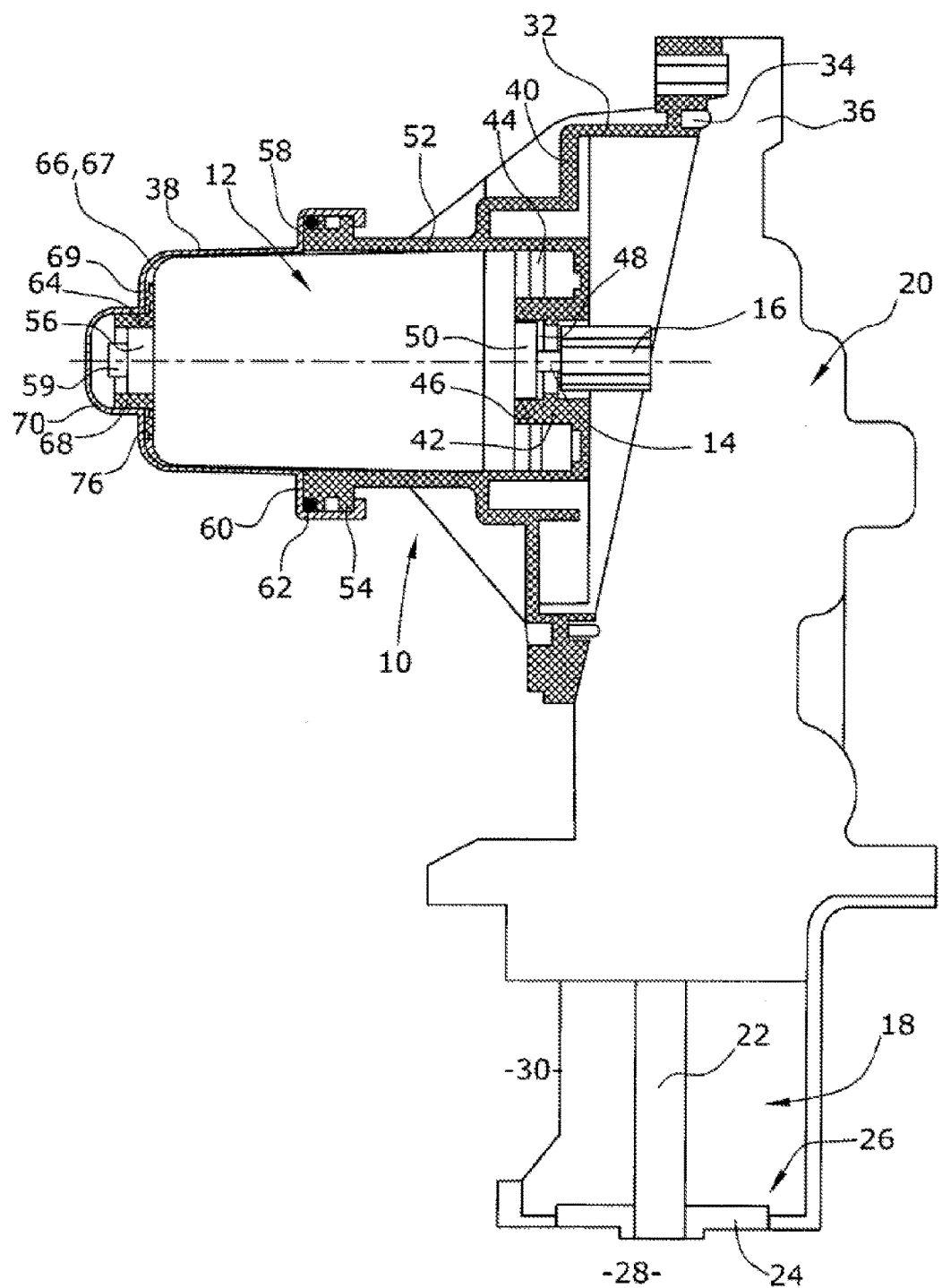
FIG. 1 shows a partially sectional lateral view of a first drive arrangement for an exhaust gas recirculation valve in accordance with the present invention.

Because the housing comprises a static receiving part and a cover fastened thereon which is in axial abutment on a stop on the static receiving part, with the intermediate element being arranged radially between the cover and the drive element and, in an elastically deformed state, axially between the drive element and the cover, a vibration-damping decoupling of the electric motor from the housing both axially and radially is achieved. The drive element can be mounted in a simple manner, and the housing components can be produced with large tolerances in an inexpensive manner because differences in size can be compensated by the intermediate element.

With regard to the exhaust gas recirculation valve, the fact that the electric motor, under the effect of the spring force of the elastically deformable intermediate element, is axially preloaded against an A-bearing plate formed on the housing and is radially supported in the cover by the intermediate element, it possible to also provide a vibration decoupling on all sides and to brace the electric motor in the housing, thereby providing a safe engagement of the driving toothed wheel in the transmission downstream thereof and a damping the mechanical stresses. The useful life of the electric motor is consequently extended. The tolerances between the size of the electric motor, the accommodation housing, and the cover can be distinctly increased.

The embodiment hereinafter described can be advantageously used for various applications of the drive arrangement as well as for the exhaust gas recirculation valve.

In an embodiment of the present invention, the intermediate element can, for example, comprise a central opening with an axial end of the drive element extending through or into it. The end of the drive element is thereby encompassed so that, in the mounting process, the intermediate element can be simply shifted into place.

In an embodiment of the present invention, the intermediate element can, for example, comprise a disk-shaped portion, with one or a plurality of projections extending therefrom in the axial direction, the projections being arranged in an elastically deformed state between an axial abutment face of the cover and an axial abutment face of the drive element. These projections serve for the axial decoupling, and for an axial tolerance compensation, of the drive element relative to the cover. The abutment area toward the cover or toward the drive element is reduced whereby, with the same degree of hardness, a stronger spring effect and/or elasticity is achieved compared to a full-faced abutment, and the surface area available for heat transmission is reduced.

In an embodiment of the present invention, the axially extending projection can, for example, have an annular shape. This contributes to the sealing function of the intermediate element.

In an embodiment of the present invention, the axially extending projections can, for example, be formed as a plurality of nubs distributed along the periphery. This results in a particularly good elastic effect of the individual nubs.

In an embodiment of the present invention, the intermediate element can, for example, comprise an annular, elastic collar which is abutted radially inwardly by the drive element and is abutted radially outwardly by the cover. In addition to the axial support and preloading of the drive element, the drive element is, in a simple manner, thereby also supported in the cover with a radial damping by use of only one component part.

In an embodiment of the present invention, the collar can, for example, surround the central opening and the axial end of the drive element and is radially surrounded by a cup-shaped receiving portion formed on the cover. The bearing support of the drive element is thus effected directly in the area of the B-bearing of the drive element. The cup-shaped receiving portion extending into the B-bearing can be produced with a corresponding large tolerance because a contact between the receiving portion and the B-bearing area is prevented by the collar.

In an embodiment of the present invention, the collar on its outer peripheral surface can, for example, comprise raised portions distributed along the outer periphery. This facilitates the assembly process because the raised portions can be radially compressed in a more simple manner. Shift-on attachment can thus be reliably performed by a low force while obtaining good damping properties in the radial direction.

In an embodiment of the present invention, the collar of the intermediate element can, for example, be arranged on the outer periphery of the disk so that the radial bearing support is effected via the outer periphery of the drive element.

In an embodiment of the present invention, the intermediate element can, for example, be formed in one piece from an elastomer or from another elastic non-metallic material. This allows for a simple manufacture and assembly, and good elastic properties will be provided, wherein, by changing the Shore hardness, the damping can also be changed and self-resonances can be shifted.

In an embodiment of the present invention, the cover with its cup-shaped receiving portion can, for example, be formed as a deep-drawn component. This allows for a particularly inexpensive manufacturing process. Too narrow tolerances are no longer required so that, compared to known bearing supports, the radii generated in deep-drawing can be tolerated without disadvantages.

The drive arrangement of the present invention and the exhaust gas recirculation valve of the present invention are thus distinguished by a long useful life as a result of vibration decoupling on all sides, and by particularly inexpensive manufacture and assembly processes, because it is possible to use easily manufactured component parts and because of the existing high insensitivity to tolerances.

Further advantages and features of the present invention will hereafter be explained via the Figures and by way of several exemplary embodiments.

Identical features are marked by identical reference numerals throughout the Figures.

FIG. 1 shows a drive arrangement comprising a housing 10 accommodating a drive element 12 in the form of an electric motor. In the shown embodiment, a drive shaft 14 of the electric motor 12 has a drive pinion 16 arranged on it for common rotation therewith, the drive pinion 16 serving to operate an exhaust gas recirculation valve 18 via a transmission 20. The exhaust gas recirculation valve 18 comprises a valve plate 24 arranged on a valve shaft 22 and controlling a passage 26 between an inlet 28 and an outlet 30 in a known manner. However, the drive arrangement can also be used to operate or to drive pumps or flaps.

The illustrating housing 10 is of a multi-part design and comprises a static receiving part 32, shown in sectional view, which, with interposition of an intermediate seal 34, is fastened on a transmission housing member 36, and a cover 38 fastened to the static receiving part 32. The static receiving part 32 comprises a cover portion 40 in which the intermediate seal 34 is arranged and by which the transmission housing member 36 is closed. In its radially inner area relative to intermediate seal 34, the cover portion 40 comprises an A-bearing plate 42 having a circuit board 44 arranged therein to control and contact the electric motor 12, and having an annular abutment portion 46 formed on it which is axially abutted by the electric motor 12. Internally of the abutment portion 46, an opening 48 is formed through which the drive pinion 16 extends and which radially surrounds the first radial bearing 50 of electric motor 12.

On the side opposite to the transmission housing member 36, there extends a hollow cylindrical portion 52 radially surrounding the electric motor 12 and having an annular widened portion 54 formed on its end. After insertion of the electric motor 12 into the hollow cylindrical portion 52 of static receiving part 32, the cover 38 will be shifted onto the electric motor 12. The cover 38 is a sheet-metal component produced by deep-drawing, likewise surrounding the electric motor 12 via the portion not covered by the hollow cylindrical portion 52.

Cover 38 is substantially shaped in the manner of a cup having three diameters decreasing in steps. The largest diameter encloses the annular widened portion 54 at the static receiving part 32, while the intermediate portion radially surrounds the electric motor 12 at a small distance. The rear portion, closed in the rearward direction, surrounds a B-bearing portion 56 of electric motor 12 forming an axial end 59 of electric motor 12.

In the assembly process, the largest diameter will be shifted over the annular widened portion 54 until a first step 58 will have come to abut, between the largest two diameters of cover 38, against an abutment portion 60 formed by the axial end of annular widened portion 54. The annular widened portion 54 comprises an annular recess facing toward the first step 58 and having an O-ring 62 arranged in it, thus effecting a tight connection. The end of cover 38 will then be crimped behind the annular widened portion 54 and thereby be fastened to the static receiving part 32.

According to the present invention, however, in this process of shifting the cover 38 against the abutment portion 60, an intermediate element 64 previously shifted into place via the B-bearing portion 56 will also be elastically deformed, while, in this condition, the intermediate element 64 is clamped, in a preloaded state, between a rear wall 66 of electric motor 12 serving as an axial abutment face 67 of the electric motor 12, and a second step of cover 38 forming the transition between the smallest and the intermediate diameter of cover 38 and serving as an axial abutment face 69 of cover 38. At the same time, an annular collar 68 of intermediate element 64 which surrounds the B-bearing portion 56 and thus the axial end 59 of electric motor 12, will be received and radially braced in a cup-shaped receiving portion 70 of the cover 38 formed by the portion of the cover 38 having the smallest diameter.

Figure 2:
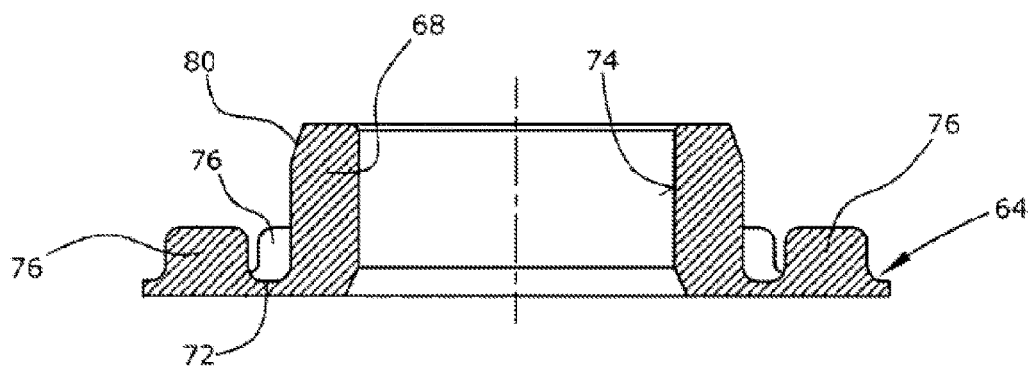
FIG. 2 shows a sectional lateral view of the intermediate element according to FIG. 1.
Figure 3:
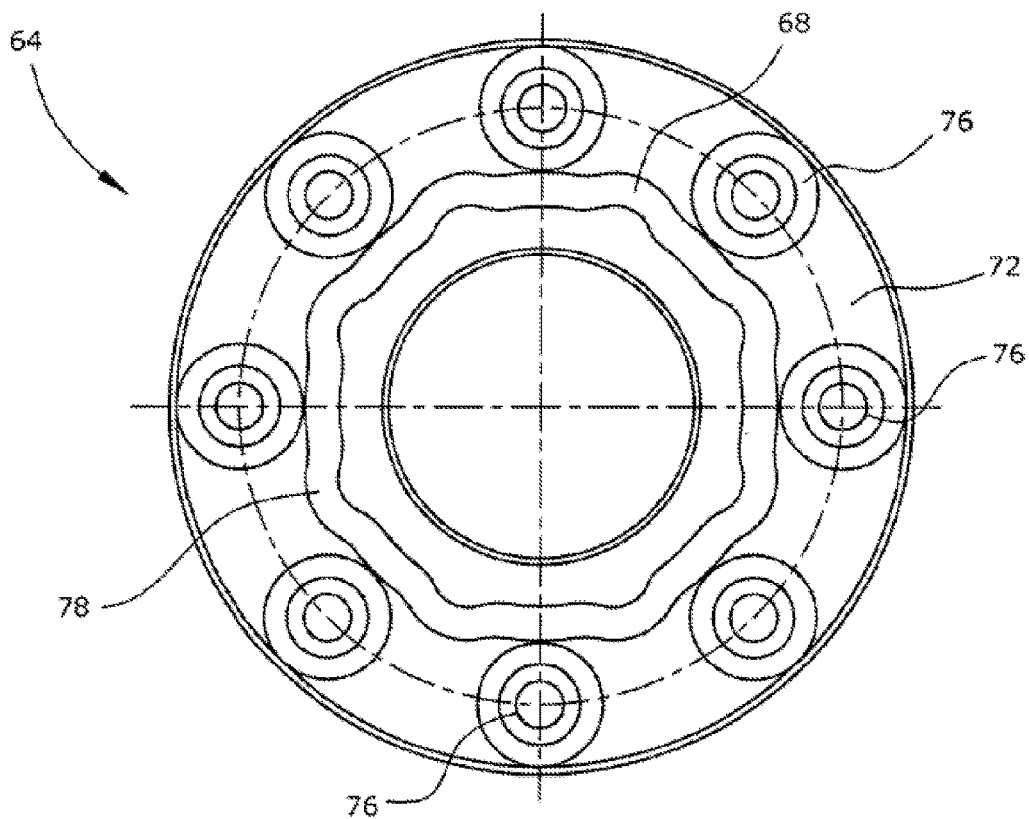
FIG. 3 shows a plan view of the intermediate element according to FIG. 2.

The intermediate element 64 is made of an elastomer and, as can be seen in FIGS. 2 and 3, consists of a disk-shaped portion 72 comprising a central opening 74. In the radially outer area of the disk-shaped portion 72, eight projections in the form of nubs 76 extend from the disk-shaped portion 72 in the axial direction, the projections being distributed along the periphery. During assembly, these nubs 76 will be axially compressed between the axial abutment faces 67, 69 of electric motor 12 and cover 38. They are arranged to face in the direction of the cover 38 so that the disk-shaped portion 72 is in abutment on the rear wall 66 of electric motor 12. From the radial inner area of the disk-shaped portion 72, the annular collar 68, while surrounding the central opening 74, extends in the axial direction. This annular collar 68 also comprises, on its outer side, eight raised portions 78 so that an undulated surface is generated, each of the raised portions 78 extending from the disk-shaped portion 72 to a position shortly before the axial end of annular collar 68. At the outer periphery of the annular collar 68, the end of the annular collar 68 is provided with a bevel 80 whereby, while the cover 38 is being shifted via the bevel 80 onto the intermediate element 64, there will occur a gradual centering of the B-bearing portion 56 in the cup-shaped receiving portion 70. The assembly process is thus distinctly facilitated because a radial pressure will be generated only after the bevel 80 has been passed during the shifting movement onto the annular collar 68.

By the elasticity of the intermediate element 64, there is thus achieved an accommodation of the electric motor 12 in the cover 38 that is vibration-damped in the axial and radial directions. The cover 38 can be produced with large tolerances and radii because these are compensated by the intermediate element 64.

Figure 4:
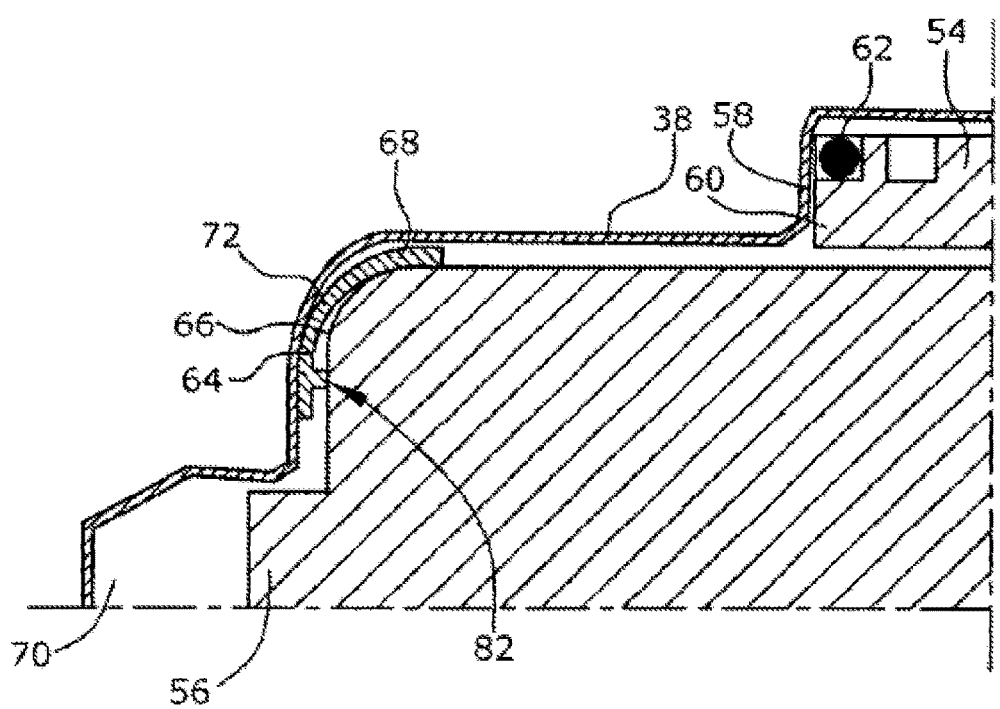
FIG. 4 shows a schematic lateral view of an alternative drive arrangement in accordance with the present invention.

In the embodiment according to FIG. 4, the disk-shaped portion 72 is provided with an annular projection 82 extending in the direction of the rear wall 66 of electric motor 12 and being elastically deformed during assembly. In this embodiment, however, the radial support of the electric motor 12 in the cover 38 is achieved via the outer diameter of electric motor 12 and thus at the intermediate diameter of cover 38. The disk-shaped portion 72 of the intermediate element 64 has a larger diameter than the electric motor 12. In correspondence thereto, when the cover 38 is shifted into place, the radially outer projecting area of the disk-shaped portion 72 will be folded inwardly and be clamped between the outer diameter of electric motor 12 and the intermediate portion of cover 38. In this state, the area forms the annular collar 68 but, in the assembled state, extends in the direction of the static receiving part 32.

This embodiment also makes it possible, by use of component parts which can be produced in an inexpensive manner and by way of a facilitated assembly process, to realize a drive arrangement which has a long useful life because the impact and vibration stresses acting on the drive element are distinctly reduced both axially and radially. This drive is particularly suited for an exhaust gas recirculation valve.

It should be evident that the scope of protection of the main claim is not restricted to the described embodiments. There can in particular be used mixed forms of the two embodiments, or other drive elements. This arrangement is also suited for other uses. Other constructional changes of the housing, the cover, or the drive elements are also conceivable without leaving the scope of protection of the main claims. Reference should also be had to the appended claims.

What is claimed is:

1. A drive arrangement for an aggregate of an internal combustion engine, the drive arrangement comprising:
 a drive element;
 a housing comprising,
   a static receiving part comprising a stop, the static receiving part being configured to have the drive element be arranged therein, and
   a cover fastened on the static receiving part, the cover being configured to bear axially against the stop and to be shiftable against the stop; and
 an intermediate element arranged,
   in a preloaded state, between the drive element and the housing,
   radially between the cover and the drive element, and
   in an elastically deformed state, axially between the drive element and the cover.

2. The drive arrangement as recited in claim 1, wherein, the drive element comprises an axial end,
 the intermediate element further comprises a central opening, and
 the axial end of the drive element extends through or into the central opening.

3. The drive arrangement as recited in claim 2, wherein, the drive element comprises a drive element axial abutment face,
 the cover comprises a cover axial abutment face, and the intermediate element further comprises a disk-shaped portion from which at least one projection extends in an axial direction, the at least one projection being arranged in an elastically deformed state between the cover axial abutment face and the drive element axial abutment face.

4. The drive arrangement as recited in claim 3, wherein the at least one projection comprises an annular shape.

5. The drive arrangement as recited in claim 3, wherein the at least one projection is formed as a plurality of nubs distributed along a periphery of the disk-shaped portion.

6. The drive arrangement as recited in claim 2, wherein the intermediate element further comprises an annular collar which is configured to be elastic, to extend axially, to be inwardly abutted by the drive element, and to be radially outwardly abutted by the cover.

7. The drive arrangement as recited in claim 6, wherein the annular collar comprises raised portions on its outer peripheral surface distributed along an outer periphery.

8. The drive arrangement as recited in claim 6, wherein the annular collar is arranged on an outer periphery of the disk-shaped portion.

9. The drive arrangement as recited in claim 6, wherein,
the cover further comprises a cup-shaped receiving portion formed thereon, and
the annular collar is further configured to surround the central opening and the axial end of the drive element, and to be radially surrounded by the cup-shaped receiving portion.

10. The drive arrangement as recited in claim 9, wherein the cover with its cup-shaped receiving portion is formed as a deep-drawn component.

11. The drive arrangement as recited in claim 1, wherein the intermediate element is formed in one piece from an elastomer or from an elastic non-metallic material.

12. An exhaust gas recirculation valve comprising:
a housing comprising,
a static receiving part comprising a stop, and
a cover fastened on the static receiving part, the cover being configured to bear axially against the stop and to be shiftable against the stop;
an A-bearing plate formed on the housing;
a transmission;
a passage between an inlet and an outlet;
a valve configured to regulate the passage between the inlet and the outlet;
an intermediate element configured to be elastically deformed so as to have a spring force;
an electric motor serving as a drive element arranged in the static receiving part, the electric motor being configured to drive the valve via the transmission;
wherein,
the elastically deformed intermediate element is arranged axially between the electric motor and the cover, and
the electric motor, via the spring force of the elastically deformed intermediate element, is axially preloaded against the A-bearing plate and is radially supported in the cover by the intermediate element.

13. The exhaust gas recirculation valve according to claim 12, wherein the exhaust gas recirculation valve comprises a drive arrangement comprising:
the electric motor as the drive element;
the housing; and
the intermediate element.

* * * * *